US006807547B2

United States Patent
Matena et al.

(10) Patent No.: US 6,807,547 B2
(45) Date of Patent: Oct. 19, 2004

(54) METHOD AND APPARATUS FOR IMPLEMENTING TIMERS FOR ENTERPRISE JAVABEAN COMPONENTS

(75) Inventors: Vladimir Matena, Redwood City, CA (US); Mark W. Hapner, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 471 days.

(21) Appl. No.: 09/848,802

(22) Filed: May 3, 2001

(65) Prior Publication Data

US 2002/0004851 A1 Jan. 10, 2002

Related U.S. Application Data

(60) Provisional application No. 60/217,180, filed on Jul. 10, 2000.

(51) Int. Cl.[7] .............................................. G06F 7/00
(52) U.S. Cl. ................................. 707/103 R; 707/10
(58) Field of Search ....................... 707/103 R, 10; 719/318; 715/507; 717/104, 107

(56) References Cited

U.S. PATENT DOCUMENTS

| 6,253,244 B1 | * | 6/2001 | Moore et al. | 709/231 |
| 6,505,342 B1 | * | 1/2003 | Hartmann et al. | 717/104 |
| 6,654,932 B1 | * | 11/2003 | Bahrs et al. | 715/507 |
| 2002/0116642 A1 | * | 8/2002 | Mastrianni | 713/201 |

FOREIGN PATENT DOCUMENTS

EP 0735475 10/1996

OTHER PUBLICATIONS

Suresh Raj, "Enterprise Java Beans", Internet Article, Online!, Dec. 19, 1998.
Thomas, A. "Enterprise JavaBeans Technology—Server Component Model for the Java Platform", Patricia Seybold Group, Online!, Dec. 1998.

* cited by examiner

Primary Examiner—Diane D. Mizrahi
(74) Attorney, Agent, or Firm—Beyer Weaver & Thomas, LLP (57) ABSTRACT

Methods and apparatus for implementing state machines as enterprise beans with reliable or transactional timers on an enterprise platform are disclosed. According to one aspect of the present invention, a state machine is arranged to be used within a computing system that supports an enterprise platform. The state machine includes an entity object, a home interface associated with the entity object, and a remote interface associated with the entity object. The home interface is arranged to create, find, and remove entity objects, while the remote interface is arranged to drive the state machine. The entity object is arranged to be deployed in a bean container, which includes a timer. In addition to including a timer, the bean container is arranged to invoke the entity object using the remote. In one embodiment, the timer is transactional.

8 Claims, 6 Drawing Sheets

METHOD AND APPARATUS FOR IMPLEMENTING TIMERS FOR ENTERPRISE JAVABEAN COMPONENTS

CROSS REFERENCE TO RELATED APPLICATION

This application takes priority under U.S.C. 119(e) of U.S. Provisional Application No.: 60/217,180 filed Jul. 10, 2000 entitled, "METHOD AND APPARATUS FOR IMPLEMENTING STATE MACHINES AS ENTERPRISE JAVABEAN COMPONENTS" by Matena et. al. which is incorporated by reference in its entirety. This application is also related to U.S. patent application Ser. No. 09/848,820, entitled "METHOD AND APPARATUS FOR IMPLEMENTING STATE MACHINES AS ENTERPRISE JAVABEAN COMPONENTS" by Matena et. al. filed concurrently herewith and incorporated by reference in its entirety.

BACKGROUND OF THE INVENTION

1. Field of Invention

The present invention relates generally to computing systems which utilize Enterprise JavaBeans. More particularly, the present invention relates to timers for state machines which are implemented as Enterprise JavaBeans.

2. Description of the Related Art

The Java 2 Platform, Enterprise Edition (J2EE) is an industry-standard general purpose platform for the development of enterprise business applications. Enterprise business applications include applications for purchase order management or transactions processing. As a part of J2EE, application logic may be implemented using the Enterprise JavaBeans (EJB) component model which provides application development tools for application developers.

In general, an EJB component model is a component architecture for the development and the deployment of object-oriented, distributed, enterprise-level applications. An application developed using the EJB component model is scalable and transactional, and is typically portable across multiple platforms, which enables an EJB component to effectively be "written once" and "used substantially anywhere." That is, EJB components may also be used by multiple applications, i.e., EJB components may be shared or reused. As will be understood by those skilled in the art, the EJB component model enables application development to be simplified due, at least in part, to the fact that typically difficult programming problems are implemented by an EJB container, and not the application.

Some applications utilize state machines, or are designed to use the concept of a state machine in their implementation, and have generally not been developed using J2EE. Specifically, there has been a perceived mismatch between the J2EE programming model and requirements associated with state machines. A state machine may be considered to be a behavior that specifies the sequences of states that an object goes through during its lifetime in response to events, in addition to its responses to those events. A state of an object is a condition or a situation during the lifetime of an object which satisfies some condition, performs some activity, or waits for one or more events. An event is the specification of an occurrence that has a location in time or space that may trigger a state transition associated with the object.

Figure 1:
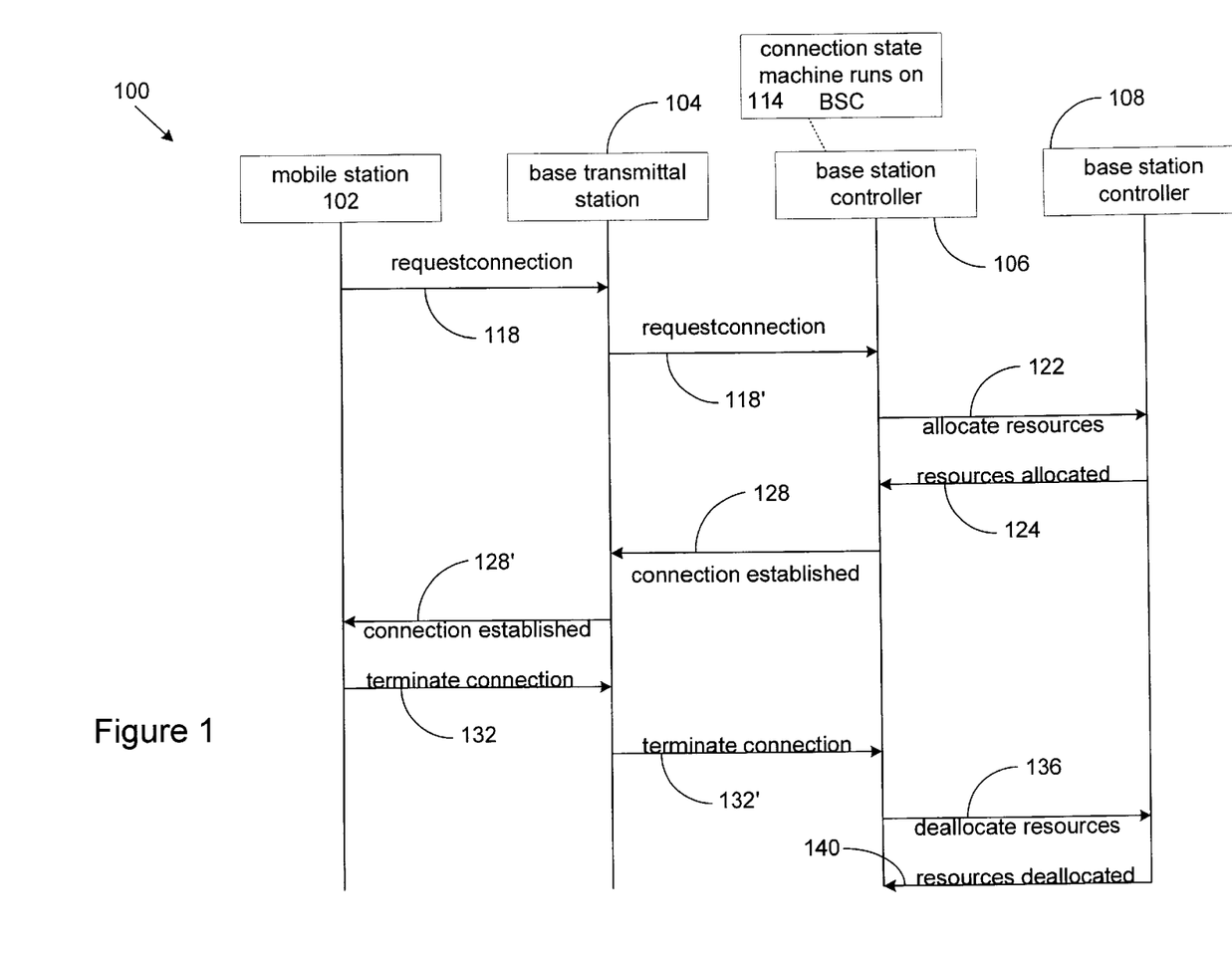
FIG. 1 is a diagrammatic representation of a state machine associated with a telecommunications application.

Applications which use state machines include telecommunications, or "telecom," applications. Typically, within telecom applications, each telecom vendor uses its own proprietary technique to implement state machines. A state machine which may be used in a telecom application is shown in FIG. 1. FIG. 1 illustrates a state machine that is associated with a base station controller in a cellular telecom network. A cellular network 100 includes a mobile station (MS) 102, a base transmittal station (BTS) 104, a base station controller 106, and a mobile switching center 108. MS 102 may be substantially any device which is suitable for use within cellular network 100, e.g., MS 102 may be a cellular telephone. BTS 104 generally includes radio equipment that controls a cell within cellular network 100. BSC 106 is a telecom application that provides the implementation of call control logic, such as the logic for the setup and the termination of connections. MSC 108 includes telecom equipment that handles the traffic, e.g., voice traffic, of established connections.

BSC 106 or, more specifically, the telecom application associated with BSC 106, is generally implemented as a connection state machine 114 or a set of connection state machines. Connection state machine 114 implements the protocol for the setup of, and the termination of, connections between MS 102 and MSC 108.

The connection setup and termination protocol generally begins when MS 104 requests a connection by sending a RequestConnection event 118 to BTS 104. BTS 104 then sends RequestConnection event 118' to BSC 106, which causes a connection state machine object to be created within BSC 106 or, more specifically, the telecom application within BSC 106.

Upon creating a connection state machine object, connection state machine 114 sends an AllocateResources event 122 to MSC 108 to essentially request that MSC 108 allocate resources for voice traffic. Once MSC 108 has allocated the resources as requested, MSC 108 generates a ResourcesAllocated event 124 which is sent to BSC 106 and indicates that resources have been allocated.

After receiving ResourcesAllocated event 124 from MSC 108, BSC 106 or, more specifically, connection state machine 114 sends a ConnectionEstablished event 128 to BTS 104 indicating that a connection has been established in response to a request from MS 102. In response to receiving ConnectionEstablished event 128, BTS 104 sends ConnectionEstablished event 128' to MS 102 such that MS 102 is notified of an established connection.

When MS 102 no longer needs a connection, i.e., once MS 104 has completed its use of a connection, MS 102 may "hang up" on the connection. When MS 104 hangs up on the connection, MS 102 sends a TerminateConnection event 132 to BTS 104. Upon receipt of TerminateConnection event 132 by BTS 104, BTS 104 sends TerminateConnection event 132' to BSC 106 and, hence, connection state machine 114. Connection state machine 114, in turn, sends a DeallocateResources event 136 to MSC 108, which deallocates voice traffic resources, and sends a ResourcesDeallocated event 140 to BSC 106. It should be appreciated that once BSC 106 receives ResourcesDeallocated event 140, BSC 114 deletes the state machine object it allocated in response to RequestConnection event 118'.

Figure 2:
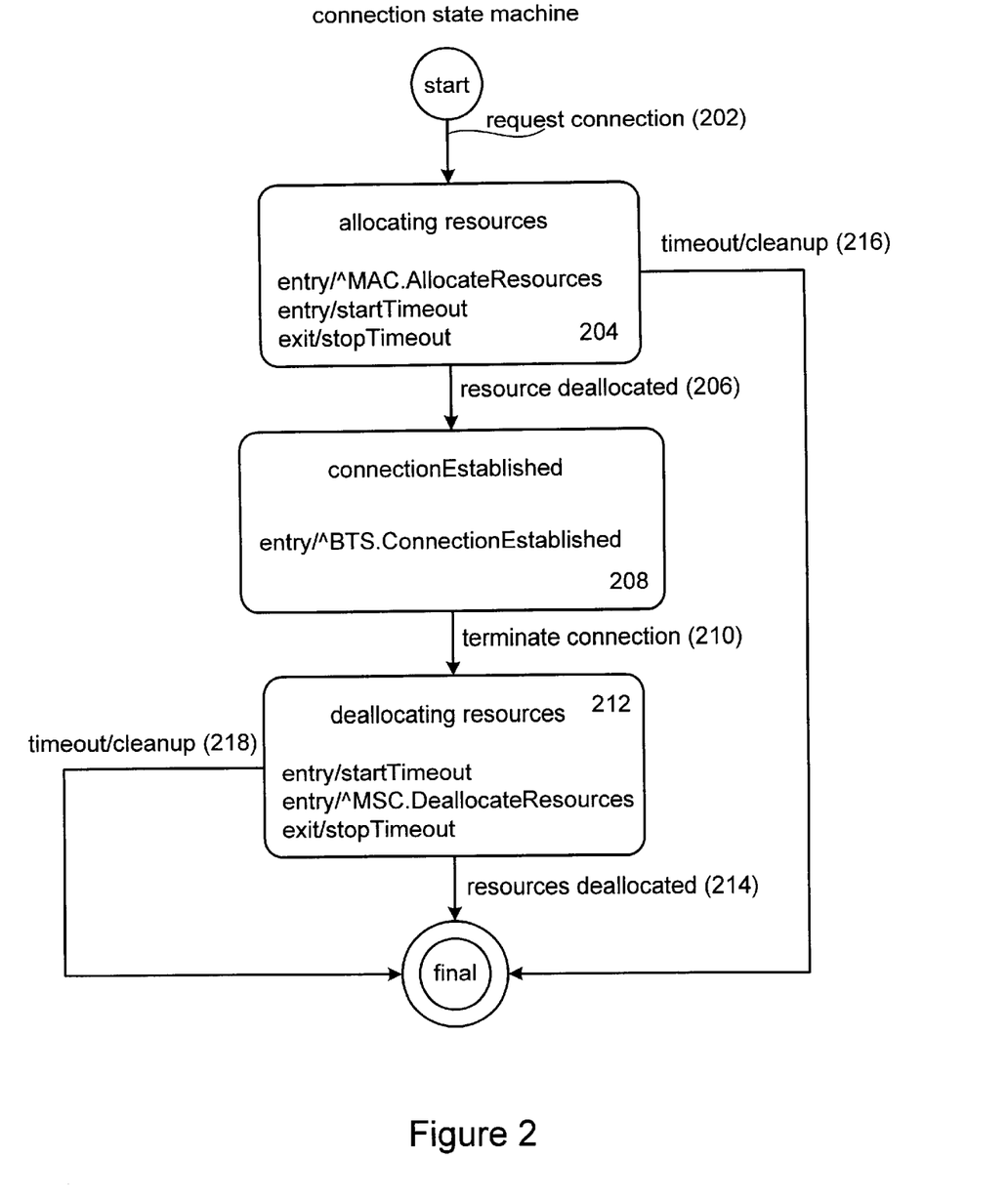
FIG. 2 is a state chart diagram which illustrates an algorithm of a connection state machine, e.g., state machine 114 of FIG. 1.

FIG. 2 is a state chart diagram which illustrates an algorithm of a connection state machine, e.g., state machine 114 of FIG. 1. That is, FIG. 2 is an algorithmic representation of an overall connection process associated with cellular network 100 of FIG. 1. A process of implementing a connection begins at step 202 in which a connection is requested. The request for a connection results in the creation of a connection state machine object. Once a connection is requested, allocation of resources is effectively requested in step 202, and resources for the connection are allocated in step 204, e.g., for voice traffic in a cellular telecommunications network. When resources are allocated, voice traffic is allowed to "flow" over the cellular telecommunications network. Once the connection is no longer needed, the connection is terminated in step 210, and the deallocation of resources allocated to the connection is commenced in step 212. After resources are deallocated in step 214, the process of implementing a connection concludes.

In the course of allocating resources, timeouts may occur, as will be appreciated by those skilled in the art. When timeouts occur during the allocation of resources or the deallocation of resources, cleanups occur, as for example in steps 216 and 218. Once cleanups have occurred, the process of implementing a connection is terminated.

A state machine generally uses timers to bound the time interval in which the state machine exists in a particular state. Typically, a state machine enters a state with an expectation that it will receive an external event within a specified time interval. To ensure that a state machine does not wait for too prolonged a time for the external event to occur, the state machine may create a timer that is in tact over the course of the specified time interval. When an external event occurs prior to the expiration of the timer, then the state machine cancels the timer. Alternatively, when an external event does not occur prior to the expiration of the timer, i.e., when the timer expires, the state machine is signaled. Typically, the state machine is signaled to proceed to a new state.

A timer service typically provides a timer creation method that uses a time duration, expiration callback, and identifying data as input and returns a timer cancellation token or callback as output. The timer service begins counting down the time duration immediately after the timer is created. A timer may generally be cancelled by either calling a services cancellation method with the cancellation token or, alternatively, by calling its associated cancellation callback method. If the timer duration expires before it is cancelled, the service signals the expiration by calling its expiration callback with identifying data from the timer. Once the timer is either cancelled or expires, the timer ceases to exist.

A timer service is crucial to a state machine since timer services are used by a state machine to provide a limit or bound for a time interval in which the state machine exists in a particular state, as previously mentioned. Therefore, what is desired is a method for implementing a state machine as an enterprise bean and for implementing a reliable timer service for use with such an enterprise bean.

SUMMARY OF THE INVENTION

The present invention relates to implementing state machines as enterprise beans with reliable or transactional timers on an enterprise platform. A reliable timer often implies that the creation of a timer is part of an atomic transaction and generally only occurs if all other work in the transaction has been committed. According to one aspect of the present invention, a state machine is arranged to be used within a computing system that supports an enterprise platform. The state machine includes an entity object, a home interface associated with the entity object, and a remote interface associated with the entity object. The home interface is arranged to create, find, and remove entity objects, while the remote interface is arranged to drive the state machine. The entity object is arranged to be deployed in a bean container, which includes a timer. In addition to including a timer, the bean container is arranged to invoke the entity object using the remote. In one embodiment, the timer is transactional.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Enabling vendors of applications that implement state machines, such as those vendors associated with the telecommunications, or "telecom," industry, to implement state machines on an industry-standard Java 2 Enterprise Edition (J2EE) platform as Enterprise JavaBean (EJB) components reduces the costs associated with the applications that implement state machines. The ability to implement state machines as enterprise bean components, in general, allows the state machines to be portable, as well as reused in multiple applications. State machines that are mapped to enterprise bean components may also enable overall applications to be more readily developed, as difficult problems may be implemented by containers associated with the enterprise bean components, and not the overall applications.

Further, when an enterprise bean is used to implement a state machine, the implementation of the machine may be substantially simplified. By way of example, services associated with a bean container such as an EJB container, which will be described below, may be used in the implementation of the state machine. For example, a timer service included in the bean container may be used in the implementation of a state machine.

A state machine that is implemented as an EJB uses reliable timers to detect the expiration of intervals that bound the occurrence of an expected action. A reliable timer is, in one embodiment, a timer that is created as part of an atomic transaction and is substantially only created if all other work in the transaction has been committed. A reliable timer also delivers a timer expiration atomically, initiates a transaction that includes itself, and is arranged to be redelivered if its transaction aborts. It should be appreciated that a reliable timer is typically also cancelled atomically.

Figure 3:
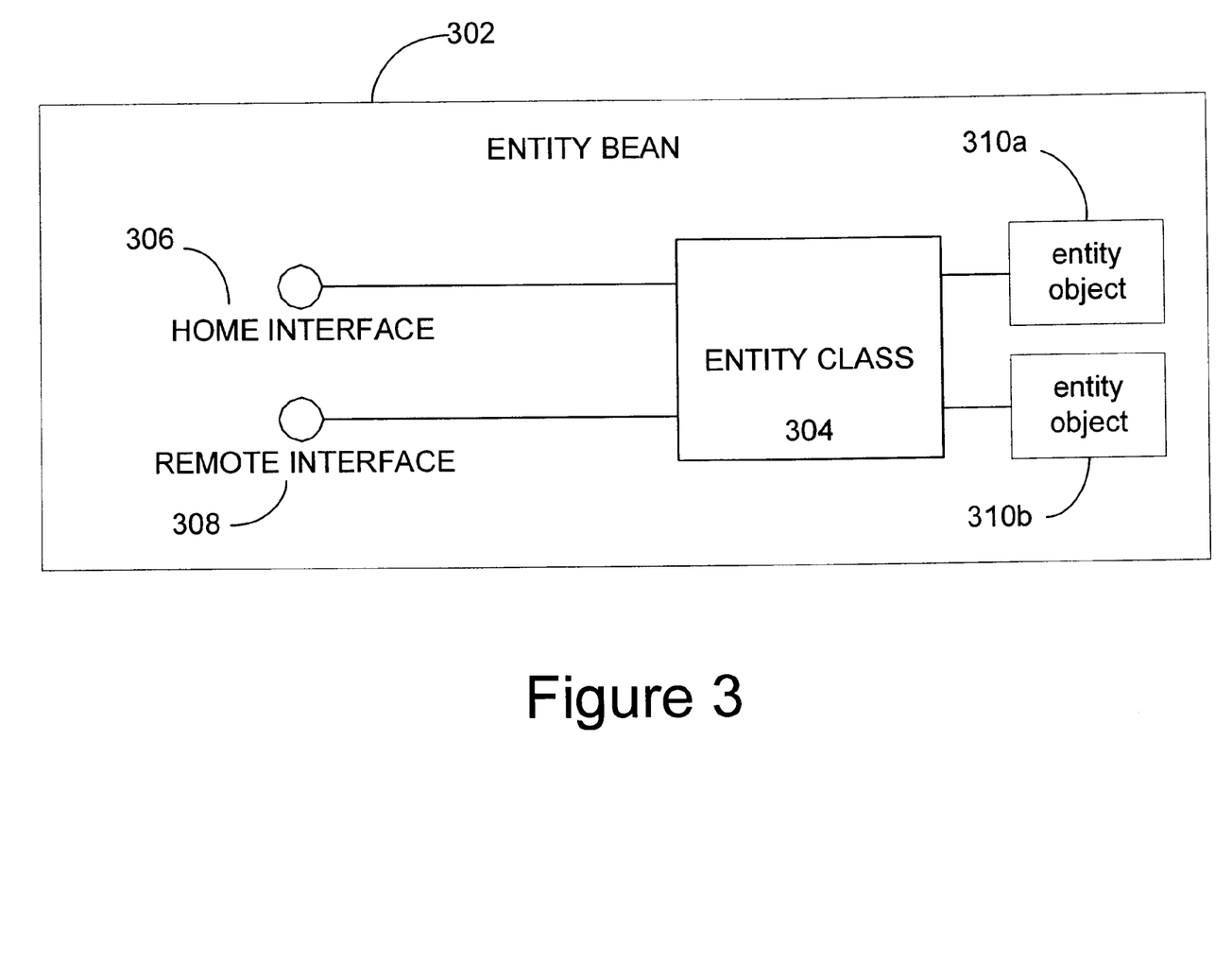
FIG. 3 is a diagrammatic representation of a JavaBean component to which deployed in an Enterprise JavaBean container in accordance with an embodiment of the present invention.

With reference to FIG. 3, a state machine that is mapped as an enterprise bean component deployed in a bean container will be described in accordance with an embodiment of the present invention. An enterprise bean 302, which may be an Enterprise JavaBean, is generally a component which is either a session bean or an entity bean. In the described embodiment, in order to be implemented as a state machine, enterprise bean 302 is an entity bean, i.e., enterprise bean 302 includes an entity object 310 and has an entity class 304. As such, enterprise bean 302 represents persistent data that may be maintained in a database, and may manage its own persistence.

Enterprise bean 302 includes a home interface 306 and a remote interface 308. Home interface 306 is arranged to create, to find, and to remove entity objects, which are associated with a state machine, from a system as necessary. Remote interface 308 defines a collection of methods which correspond to methods being recieved from outside of enterprise bean 302. In other words, remote interface 308 defines a method for each input event that a state machine, e.g., entity object, needs to respond to. Further, remote interface 308 may be used by clients to effectively "drive" a state machine, i.e., to invoke an entity object 310.

Enterprise, or entity, bean 302 is typically deployed by a container. A container as will be appreciated by those skilled in the art, is generally an entity that provides life cycle management, security, deployment, and runtime services to components deployed within the container. Among the runtime services provided by the container is a timer service. In the described embodiment, the container in which enterprise bean 302 is deployed within is an EJB container, which is a container that implements an EJB component contract to the J2EE architecture. The EJB component contract is arranged to specify a runtime environment for enterprise bean 302 that includes, but is not limited to, security, life cycle management, transaction, and deployment.

Figure 4:
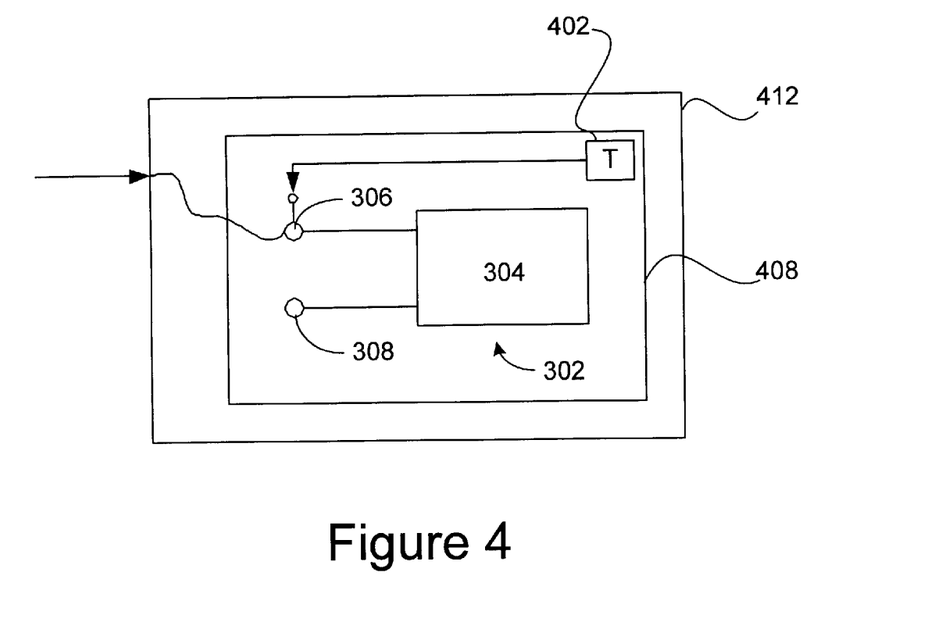
FIG. 4 is a diagrammatic representation of an Enterprise JavaBean container, e.g., container 310 of FIG. 3, which includes a timer object in accordance with an embodiment of the present invention.

FIG. 4 is a diagrammatic representation of an enterprise bean 302 deployed in a container in accordance with an embodiment of the present invention. A container 408 in which enterprise bean 302 is deployed may be a part of a J2EE platform 412. In general, container 408 responds to events received through J2EE platform 412 by invoking enterprise bean 302 via the corresponding methods of remote interface 308 of enterprise bean 302.

In general, container 408 may be encompassed by an application client 412. Typically, container 408 responds to events received through application client 412 by invoking enterprise bean 302 via the corresponding methods of remote interface 308 of enterprise bean 408.

In one embodiment, when a state machine, i.e., entity object 310 or enterprise bean 302, needs to respond to the passing of time or timeouts, remote interface 308 extends the TimedObject interface that is typically included in container 408. The TimedObject interface, or a similar interface, is arranged to allow container 408 to substantially deliver a timeout event to enterprise bean 302. As shown in FIG. 4, container 408 may include a timer T 402. Container 408 is effectively responsible for the implementation of timeouts through the use of timer T 402. Timer T 402 is arranged to notify a TimedObject interface 404 to deliver a timeout event as appropriate. Specifically, when a timeout period associated with timer T 402 expires, container 408 invokes a timeout method on entity object 310 through TimedObject interface 404.

The timer service associated with timer T 402 is implemented by container 408. In the described embodiment, the timer service is implemented as an entity bean, e.g., an EJB entity component, and may have both a home interface and a remote interface. Specifically, the entity bean associated with timer T 402 implements a Timer interface and a TimerHome interface, as will be discussed below. However, it should be appreciated that the timer service may be implemented in a variety of different configurations, i.e., the implementation of the timer service as an entity bean is one example of an implementation. The timer service may be implemented by container 408 such that it appears to clients, or clients of the timer service, as being built into entity bean 302.

A client of a timer service generally creates a transactional timer by calling a create( ) method associated with the TimerHome interface. The create( ) method provides a TimedObject reference, e.g., TimedObject interface 404 of FIG. 4, that the timer service is arranged to notify if the timer expires. Although a TimedObject reference may provide a timer duration in substantially any suitable time increment, TimedObject reference typically provides a timer duration in microseconds. A TimedObject reference also provides client-specific information that enables the timer to better recognize the significance of the expiration of the timer. In one embodiment, the timer service returns the client-specific information with an expiration notification to the client.

It should be appreciated that both client-specific and timer-specific information is typically serializable. When such information is serializable, the timer service may then marshal the values associated with the information for storage, e.g., storage outside of an associated virtual machine such as a Java virtual machine developed by Sun Microsystems, Inc., of Palo Alto, Calif.

The create( ) method returns a reference to the timer entity that is created when the create( ) method is invoked. The TimerHome interface includes a remove( ) method that is used to cancel the timer instance created by the create( ) method. In one embodiment, the remove( ) method is inherited from the entity object encompassed in a container, e.g., entity object 310 of FIGS. 3 and 4. It should be appreciated that the remote interface associated with the entity bean of the timer generally has no methods of its own, aside from the method which is used to compare information and to cancel the timer if appropriate. That is, the timer provides its clients with substantially no functionality aside from providing clients with cancellation.

When an enterprise bean creates a timer, the enterprise bean provides a TimedObject reference. If a timer expires, the timer may notify its TimedObject by calling its timeout( ) method with its timer reference and its timer information. Both the timer reference and the timer information provide the TimedObject with information that may be used to enable the TimedObject to recognize the significance of the timer. It should be understood, however, that the timeout( ) method may also be called without arguments such as a timer reference or timer information.

If the TimedObject is using the identity of the timer to recognize the current timeout, the TimedObject would generally use the isIdentical method of the timer to compare the timer reference provided to the TimedObject with other timer references which the TimedObject has outstanding. At the conclusion of a call to a timeout( ) method, the timer will generally remove itself.

Typically a client, e.g., an EJB client, may implement the TimedObject interface itself and provide its reference, e.g., EJB reference, to all timers it creates. Further, a client may register other instances of bean objects as timed objects of its associated timer.

When a state machine is implemented as an enterprise bean, the associated timer is preferably reliable. In other words, timer functions for the enterprise bean are preferably transactional, or atomic, as the use of transactional timer functions enables state machines to be readily implemented as enterprise beans.

A state machine that is implemented as an enterprise bean creates a timer using a transaction which includes updates to the state of the machine. If such a transaction were to ultimately fail, then any state changes which were made are "rolled back," or returned to the state which was in existence at the commencement of the transaction, and the timer is substantially automatically cancelled. That is, in the event that a transaction with a state update is unsuccessful, the state machine is restored to its state at the time the transaction began.

An enterprise bean container may ensure that the state of the timer service associated with the enterprise bean container is transactional. The enterprise bean container may also ensure that updates to the enterprise bean that result from requests to create a timer are done in the scope of an enterprise bean transaction.

In the event that the creation of a timer were not transactional, then a state machine implementor would generally ensure that the order in which the timer is created and state updates are performed such that the creation of the timer and the updating of the states are substantially synchronized. The use of a reliable or transactional enterprise bean timer substantially eliminates the need to synchronize the creation of the timer with the updating of the states.

When a timer expires, it calls the timeout( ) method of its associated TimedObject. The timeout( ) method, in the described embodiment, runs as an enterprise bean transaction. It should be appreciated that when a timer expires, the timer state changes in addition to the work done within the call to the timeout( ) method are done as a transaction such that the timer expiration is substantially atomic.

If a timer expiration transaction fails, e.g., when a timer fires and failures cause the timeout( ) method not to complete, then the timer service makes another call to the timeout( ) method. Recalling the timeout( ) method, or retrying a timeout, effectively ensures that an expired timer does not disappear without notifying its associated TimedObject. Further, retrying timeouts when timeouts have failed to complete also ensures that state machines are not left in inconsistent states, i.e., inconsistent states which occur when a failure occurs during the execution of the timeout( ) method.

In the event that timer expiration were not transactional, an implementor of a state machine would generally account for momentary failures causing lost timeout notifications, in addition to failures which effectively leave the state machine in a partially completed state transition. A transactional timer, or timer reliability, substantially eliminates the need to account for momentary failures and partially completed state transitions.

A timer may be cancelled in the event that the timer fails to expire. By way of example, a timer associated with a method may be cancelled when another method updates a state before the timer expires, thereby rendering the timer as unnecessary. Generally, when a state machine implemented as an enterprise bean cancels a timer, the cancellation is typically a part of a transaction that includes updates to the state of the machine. If the transaction which includes a cancellation were to fail, state changes may be rolled back, and timer cancellation may be substantially automatically rescinded.

In the described embodiment, rescinding the cancellation of a timer does not restore the remaining duration of the timer to its value at the time of the transaction, e.g., the transaction for which the timer was set, was begun. Rather, the reinstated timer has the duration it would have had if it had never been cancelled. That is, the failed cancellation had no effect on the timer. When the timer has expired by the time the transaction failed, the failure of the transaction may result in the expired timer substantially immediately providing an expiration notification.

The functionality associated with rescinding the cancellation of a timer generally involves providing the ability to retain a cancelled timer while the rescinding transaction, for example, is in progress. If the timer expires during this time, notification may be held until the result of the transaction which cancelled the timer is available. In the event that the transaction succeeds, the timer may be cancelled or its pending expiration notification may be dropped. On the other hand, in the event that the transaction fails, any pending notification may be delivered.

A timer deadlock may occur if an enterprise bean state machine were allowed to be in a transaction attempting to cancel a timer while concurrently the timer had initiated an expiration transaction and was attempting to call the timer object of the state machine. Both state machine and timer transactions would be deadlocked waiting on locks for each held by the other. For example, deadlock may occur if an event has a first lock and wants a second lock while a timer has the second lock and wants the first lock.

In one embodiment, deadlock may be prevented by enabling a timer service to get a lock on the state of its timed object prior to locking its own state. It should be appreciated that in one embodiment, a TimedObject has a lock. If the lock on the state of the timed object may not be obtained, then the associated transaction fails. The use of locks may also prevent the state machine from receiving a timer expiration while it is in a transaction that would have resulted in the cancellation of the timer. Specifically, a container may obtain a lock on a TimedObject before the timer is allowed to fire. As timers are transactional, a state machine has its event processing serialized with its timer expiration processing. Hence, a cancellation request may not be interrupted by a timer expiration.

Figure 5:
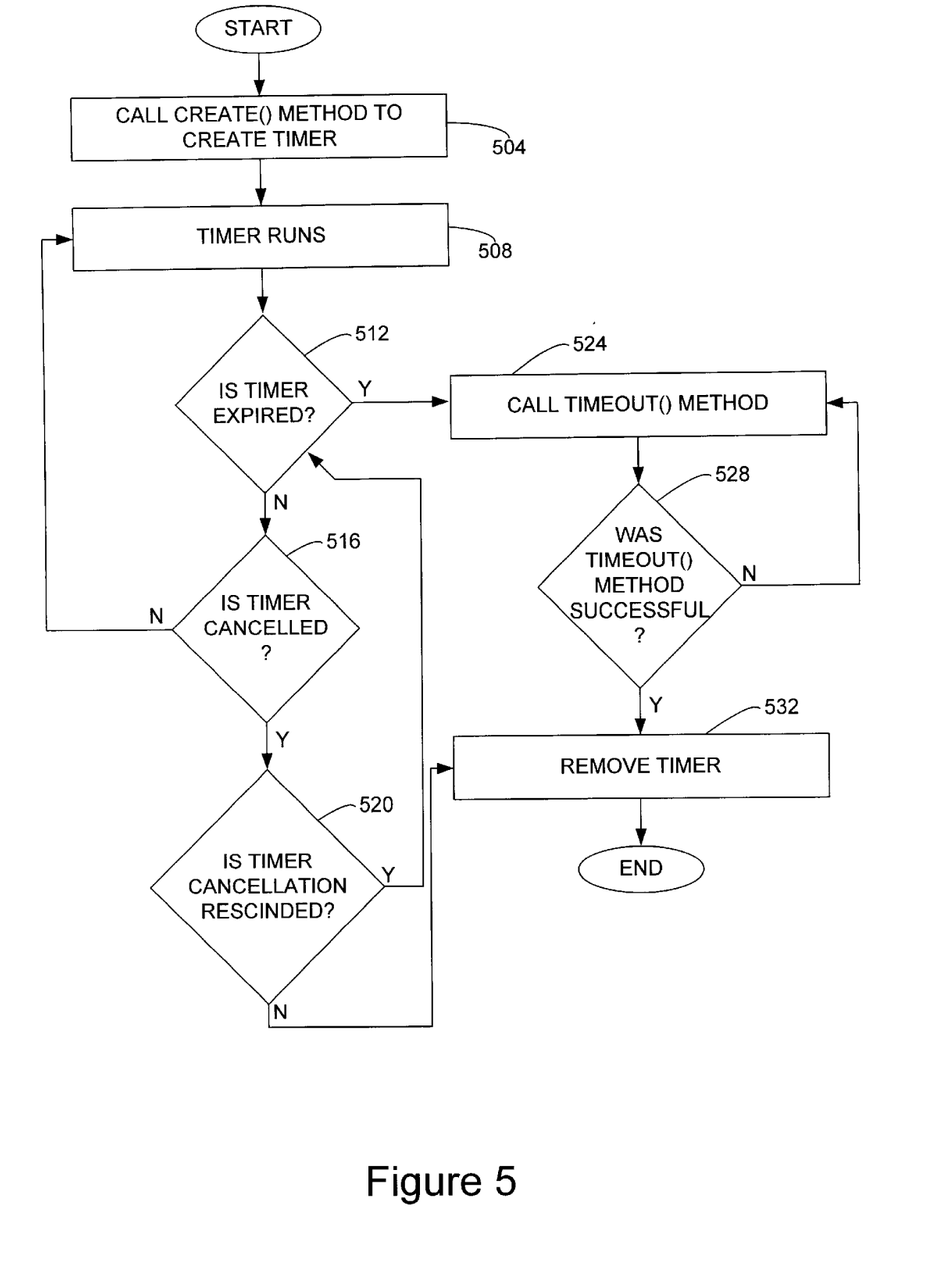
FIG. 5 is a process flow diagram which illustrates the steps associated with the processing of a timer in accordance with an embodiment of the present invention.

A general overview of the steps associated with the lifetime of a timer are illustrated in FIG. 5 in accordance with an embodiment of the present invention. When it is decided that a timer is to be created by a state machine, the state machine makes a call in step 504 to the create( ) method of a TimerHome, as was previously discussed. Once created, the timer runs in step 508 for an appropriate duration which, in one embodiment, may be predetermined by the state machine.

During the course of running, the timer may either be cancelled or will eventually expire if it is not cancelled. Accordingly, determinations are made in step 512 and 514 as to whether the timer has expired or been cancelled, respectively. If it is determined in step 512 that the timer has expired, then process flow moves from step 512 to step 524 in which the timer calls its timeout( ) method to notify the appropriate TimedObject reference. A determination is then made in step 528 as to whether the call to the timeout( ) method concluded successfully. Of the call to the timeout( )

method resulted in the successful execution of the timeout( ) method, then the timer is removed in step 532, and the processing of the timer is completed. Alternatively, if the call to the timeout( ) method was unsuccessful, i.e., the timeout( ) method did not execute successfully, then process flow returns from step 528 to step 524 in which another call to the timeout( ) method is attempted.

Returning to step 516, if it is determined that the timer is to be cancelled, e.g., that there has been a cancellation request, then a determination is made in step 520 regarding whether the timer cancellation request has been rescinded. If the timer cancellation request has been rescinded, then process flow returns to step 508 in which the timer continues to run. Alternatively, if it is determined that the timer cancellation request has not been rescinded, then the timer is removed in step 532, and the processing of the timer is completed.

Figure 6:
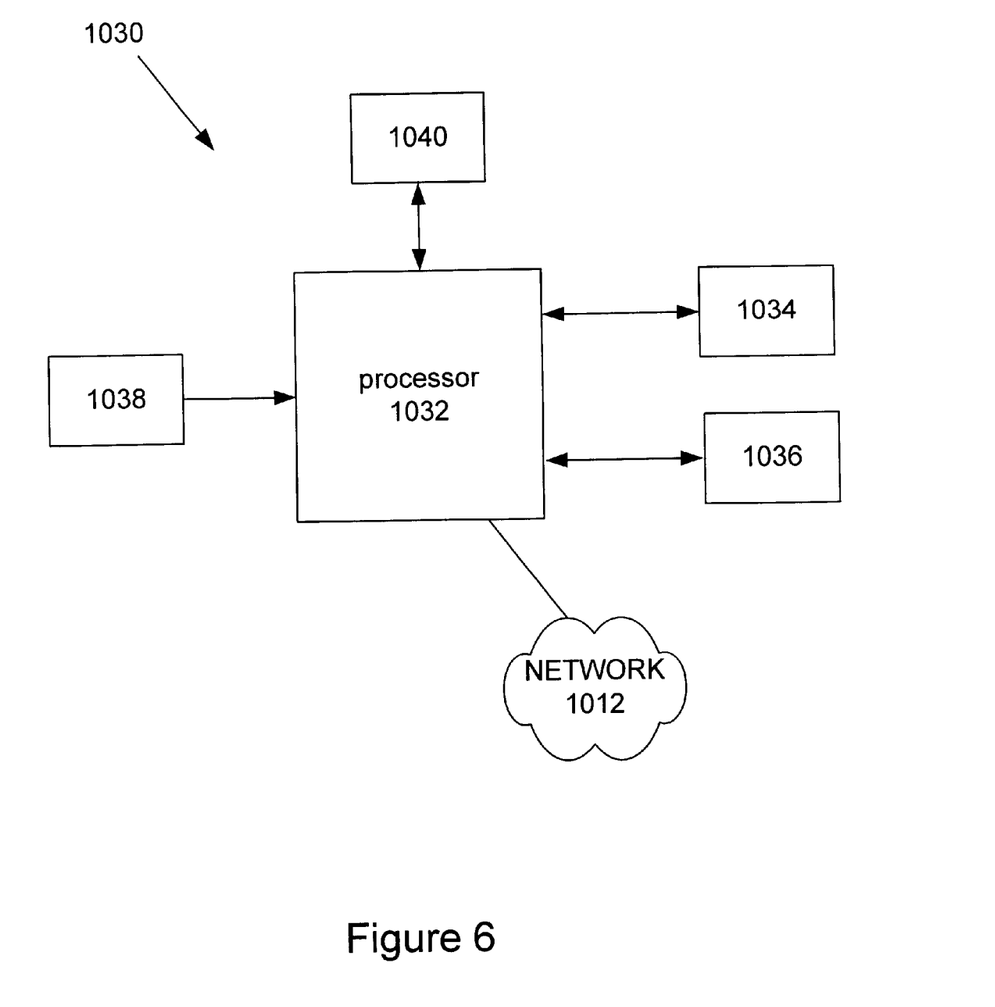
FIG. 6 is a diagrammatic representation of a typical, general-purpose computer system suitable for implementing the present invention.

FIG. 6 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the implementation of state machines as enterprise beans, or the mapping of state machines into enterprise beans, has been described as being suitable for use in a telecom application. In general, however, the implementation of state machines as enterprise beans may be applied to substantially any type of application which utilizes state machines. That is, telecom applications are only one example of applications to which enterprise beans may be applied in accordance with the present invention.

While the use of enterprise beans to implement a state machine has been generally been described in terms of Enterprise JavaBeans and the J2EE platform, substantially any suitable enterprise bean and platform may be used in the implementation of state machines. That is, the present invention is not intended to be limited to a Java computing environment and, instead, may be applied to substantially any suitable computing environment.

The steps associated with the creation of and removal of timers may generally be widely varied. Specifically, the steps may be altered, reordered, and removed. Further, additional steps may also be added. By way of example, the overview of FIG. 5 shows that a determination of whether a timer has expired precedes a determination of whether a timer has been cancelled. It should be understood, however, that such determinations may generally be made in any order, e.g., the determinations may be made substantially concurrently. That is, while a timer runs, a cancellation attempt may be made at substantially any time, and is not necessarily preceded by a determination of whether the timer has expired. A cancellation attempt may, in one embodiment, also be associated with a determination of whether a timer has expired in order to prevent cancellation from occurring if the timer has effectively already expired just as the cancellation attempt is made.

In addition, the determinations of whether a timer is expired or has been cancelled may not necessarily be actual determinations. Instead, messages or signals may be received during the course of the running of the timer which indicates that the timer is either expired or cancelled. Alternatively, messages may be received that prompt the determinations of whether a timer is expired or cancelled. In other words, checks for timer expiration or cancellation may not occur periodically. Rather, the checks may occur only when particular signals are received, or when particular conditions exist.

In one embodiment, a timer may be periodic. That is, rather than being deleted when it expires, a timer may begin a new timing interval until it is explicitly removed. Such a periodic timer may be implemented in a variety of different ways. By way of example, a timer with a periodic feature may be implemented by providing an additional create method which has an additional periodic flag parameter. In order to create a "regular" or non-periodic, e.g., "one shot," timer, the additional create method may be called either without the periodic flag or with the periodic flag set to "false." To create a periodic timer, the additional create method may be called with the periodic flag set to "true."

The use of locks has been described as substantially prevent timer deadlocks which occur, for example, when a timeout occurs in the middle of a cancellation requests. It should be appreciated, however, the constructs other than locks may instead be used to ensure that deadlock is not introduced. For instance, a race condition may be introduced such that a container is able to avoid deadlocks without departing from the spirit or the scope of the present invention. Therefore, the present examples are to be considered as illustrative and not restrictive, and the invention is not to be limited to the details given herein, but may be modified within the scope of the appended claims.

What is claimed is:

1. A state machine, the state machine being arranged to be used within a computing system that supports an enterprise platform, the state machine comprising:

an entity object;

a home interface associated with the entity object, the home interface being arranged to create, find, and remove entity objects; and a remote interface associated with the entity object, the remote interface being arranged to drive the state machine, wherein the entity object is arranged to be deployed in a bean container that that is arranged to invoke the entity object using the remote interface and wherein the bean container includes a timer.

2. A state machine according to claim 1 wherein the entity object, the home interface, and the remote interface are included in an entity bean.

3. A state machine according to claim 2 wherein the entity bean is an enterprise bean.

4. A state machine according to claim 3 wherein the enterprise bean is an Enterprise JavaBean.

5. A state machine according to claim 1 wherein the bean container is further arranged to implement a timeout in association with the timer.

6. A state machine according to claim 1 wherein the timer is created by the home interface.

7. A state machine according to claim 1 wherein the remote interface includes an identical method and a remove method.

8. A state machine according to claim 1 wherein the timer is a transactional timer.

* * * * *